(12) United States Patent
Lee (10) Patent No.: US 12,555,358 B2
(45) Date of Patent: Feb. 17, 2026

(54) IMAGE PROCESSING APPARATUS AND IMAGE PROCESSING METHOD THEREOF

(71) Applicants: Hyundai Motor Company, Seoul (KR); Kia Corporation, Seoul (KR)

(72) Inventor: Hyuk Zae Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 699 days.

(21) Appl. No.: 17/903,682

(22) Filed: Sep. 6, 2022

(65) Prior Publication Data

US 2023/0281965 A1  Sep. 7, 2023

(30) Foreign Application Priority Data

Mar. 7, 2022 (KR) .......................... 10-2022-0028943

(51) Int. Cl.
| | |
|---|---|
| *G06V 10/774* | (2022.01) |
| *G06V 10/40* | (2022.01) |
| *G06V 10/80* | (2022.01) |
| *G06V 10/82* | (2022.01) |
| *G06V 20/56* | (2022.01) |

(52) U.S. Cl.
CPC ............ *G06V 10/774* (2022.01); *G06V 10/40* (2022.01); *G06V 10/806* (2022.01); *G06V 10/82* (2022.01); *G06V 20/56* (2022.01)

(58) Field of Classification Search
CPC ...... G06V 10/40; G06V 10/806; G06V 10/82; G06V 20/56; G06V 10/454; G06V 10/764; G06V 10/44; G06V 20/80
See application file for complete search history.

(56) References Cited

U.S. PATENT DOCUMENTS

| | | | |
|---|---|---|---|
| 9,247,217 B2 | 1/2016 | Okuyama | |
| 2019/0289282 A1* | 9/2019 | Briggs | .................. H04N 23/71 |
| 2020/0033875 A1* | 1/2020 | An | ......................... H04W 4/38 |
| 2020/0111447 A1* | 4/2020 | Yaacob | .................... G09G 5/02 |
| 2021/0183026 A1* | 6/2021 | Auner | ...................... G06T 5/92 |
| 2022/0012505 A1* | 1/2022 | Kato | .................... G06V 20/58 |

(Continued)

FOREIGN PATENT DOCUMENTS

| | | |
|---|---|---|
| KR | 101939073 B1 | 1/2019 |
| KR | 102292480 B1 | 8/2021 |

OTHER PUBLICATIONS

"GAN-Based Day-to-Night Image Style Transfer for Nighttime Vehicle Detection", Che-Tsung Lin (Year: 2021).*

(Continued)

*Primary Examiner* — Chan S Park
(74) *Attorney, Agent, or Firm* — Fox Rothschild LLP (57) ABSTRACT

An image processing apparatus used in a vehicle includes an image acquisition device that obtains an input image through a device in a vehicle or an external server, a feature extraction device that extracts feature data from the input image, and image recognition logic that recognizes an object from the feature data. The feature extraction device generates a transform image using the input image by means of a generative adversarial network (GAN), extracts first feature data associated with content from the input image, extracts second feature data associated with a style from the transform image, and learns an image recognition model based on the first feature data and the second feature data.

18 Claims, 8 Drawing Sheets

(56) References Cited

U.S. PATENT DOCUMENTS

| | | | |
|---|---|---|---|
| 2022/0147773 A1* | 5/2022 | Lee | G06V 10/82 |
| 2022/0405530 A1* | 12/2022 | Metwaly | G06V 10/60 |
| 2023/0021016 A1* | 1/2023 | Feng | G06T 7/10 |
| 2023/0098133 A1* | 3/2023 | Yin | G06V 10/22 |
| | | | 382/162 |

OTHER PUBLICATIONS

Ming-Yu Liu, Thomas Breuel, Jan Kautz, "Unsupervised Image-to-Image Translation Networks," NIPS, 2017.

LA Gatys, AS Ecker, M Bethge, "Image style transfer using convolutional neural networks," CVPR, 2016.

J Johnson, A Alahi, L Fei-Fei, "Perceptual losses for real-time style transfer and super-resolution," ECCV, 2016.

\* cited by examiner

IMAGE PROCESSING APPARATUS AND IMAGE PROCESSING METHOD THEREOF

CROSS-REFERENCE TO RELATED APPLICATION

This application claims under 35 U.S.C. § 119(a) the benefit of priority to Korean Patent Application No. 10-2022-0028943, filed in the Korean Intellectual Property Office on Mar. 7, 2022, the entire contents of which are incorporated herein by reference.

TECHNICAL FIELD

The present disclosure relates to an image processing apparatus and an image processing method thereof, and more particularly, relates to an image processing apparatus for operating in various illumination environments.

BACKGROUND

An autonomous driving technology in which there may be no intervention of the driver or in which the intervention of the driver may be minimized has been used in vehicles. There may be a need for real-time recognition logic capable of operating in various illumination environments in the autonomous driving technology. Pieces of high-quality image data captured in various illumination environments may be used to learn recognition logic. Alternatively, input data of the recognition logic may be transformed into data in a specific illumination environment to be used for learning.

When large amounts of high-quality image data captured in various illumination environments may be obtained, it may be relatively easy to obtain data during the daytime, whereas it may be difficult to obtain data in a low-illumination environment such as dawn/night and quality of the data may be reduced in the low-illumination environment.

A generative adversarial network (GAN) may be used as a method for transforming illumination of images captured in various illumination environments to be similar to images captured during the daytime. The high-performance GAN should be used for high-quality image transformation. The high-performance GAN may not be suitable for developing the autonomous driving technology that may improve performance with real-time inference.

SUMMARY

The present disclosure has been made to solve the above-mentioned problems occurring in the existing technologies while advantages achieved by the existing technologies may be maintained intact.

An exemplary embodiment of the present disclosure provides an image processing apparatus capable of robustly operating even in various illumination environments and an image processing method thereof.

Another exemplary embodiment of the present disclosure provides an image processing apparatus for preprocessing image data in real time using a previously learned image recognition model, without using a high-performance generative adversarial network (GAN), and an image processing method thereof.

Another exemplary embodiment of the present disclosure provides an image processing apparatus for applying image transformation using content/style loss to images in various illumination conditions to learn an image recognition model and performing inference associated with autonomous driving using the learned image recognition model and an image processing method thereof.

Another exemplary embodiment of the present disclosure provides an image processing apparatus for reducing additional costs for obtaining various pieces of data according to various illumination environments and an image processing method thereof.

The technical problems to be solved by the present disclosure may not be limited to the aforementioned problems, and any other technical problems not mentioned herein will be clearly understood from the following description by those skilled in the art to which the present disclosure pertains.

According to an exemplary embodiment of the present disclosure, an image processing apparatus may include an image acquisition device that obtains an input image through a device in a vehicle or an external server, a feature extraction device may be configured to extract feature data from the input image, and image recognition logic may be configured to recognize an object from the feature data. The feature extraction device may be configured to generate a transform image from the input image using a generative adversarial network (GAN), may be configured to extract first feature data associated with content from the input image, may be configured to extract second feature data associated with a style from the transform image, and may be configured to learn an image recognition model based on the first feature data and the second feature data.

In an exemplary embodiment, the input image may be an image with first illumination and the transform image may be an image with second illumination brighter than the first illumination.

In an exemplary embodiment, the input image may be an image associated with autonomous driving of the vehicle.

In an exemplary embodiment, the feature extraction device may include a first backbone network and a second backbone network. The first backbone network may be configured to extract the first feature data using the input image and the second backbone network may be configured to extract the second feature data using the transform image.

In an exemplary embodiment, the first backbone network and the second backbone network may have the same weight in conjunction with extracting the first feature data or the second feature data.

In an exemplary embodiment, the feature extraction device may include a transform network and a loss network. The transform network may be configured to generate third feature data using the first feature data. The third feature data may have a content feature of the first feature data and a style feature of the second feature data.

In an exemplary embodiment, the loss network may be configured to learn the transform network based on the content feature of the first feature data and the style feature of the second feature data.

In an exemplary embodiment, the loss network may be configured to compare features extracted from the first feature data with a feature extracted from the third feature data and may learn the transform network in conjunction with content of the input image.

In an exemplary embodiment, the loss network may be configured to compare features extracted from the second feature data with a feature extracted from the third feature data and may learn the transform network in conjunction with a style of the input image.

In an exemplary embodiment, the feature extraction device may be configured to transmit the third feature data to the image recognition logic.

In a further embodiment, a vehicle is provided that comprises one or more of the image processing apparatus as disclosed herein. The vehicle suitably may be for example an electric-powered vehicle.

According to another exemplary embodiment of the present disclosure, an image processing method of an image processing apparatus may include obtaining an input image through a device in a vehicle or an external server, generating a transform image using the input image by means of a generative adversarial network (GAN), extracting first feature data associated with content from the input image, extracting second feature data associated with a style from the transform image, and learning an image recognition model based on the first feature data and the second feature data.

In an exemplary embodiment, the input image may be an image with first illumination and the transform image may be an image with second illumination brighter than the first illumination.

In an exemplary embodiment, the extracting of the first feature data may include extracting, by a first backbone network included in the image processing apparatus, the first feature data using the input image. The extracting of the second feature data may include extracting, by a second backbone network included in the image processing apparatus, the second feature data using the transform image.

In an exemplary embodiment, the first backbone network and the second backbone network may have the same weight in conjunction with extracting the first feature data or the second feature data.

In an exemplary embodiment, the image processing method may further include generating third feature data using the first feature data. The third feature data may have a content feature of the first feature data and a style feature of the second feature data.

In an exemplary embodiment, the learning of the image recognition model may include learning the transform network based on the content feature of the first feature data and the style feature of the second feature data.

In an exemplary embodiment, the learning of the image recognition model may further include comparing features extracted from the first feature data with a feature extracted from the third feature data and learns the image recognition model in conjunction with content of the input image.

In an exemplary embodiment, the learning of the image recognition model may further include comparing features extracted from the second feature data with a feature extracted from the third feature data and learns the image recognition model in conjunction with a style of the input image.

In an exemplary embodiment, the image processing method may further include recognizing an object using the third feature data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms may be only used to distinguish one element from another element, but do not limit the corresponding elements irrespective of the order or priority of the corresponding elements. Furthermore, unless otherwise defined, all terms including technical and scientific terms used herein may be to be interpreted as may be customary in the art to which the present disclosure belongs. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

Hereinafter, embodiments of the present disclosure will be described in detail with reference to FIGS. 1 to 7.

Figure 1:
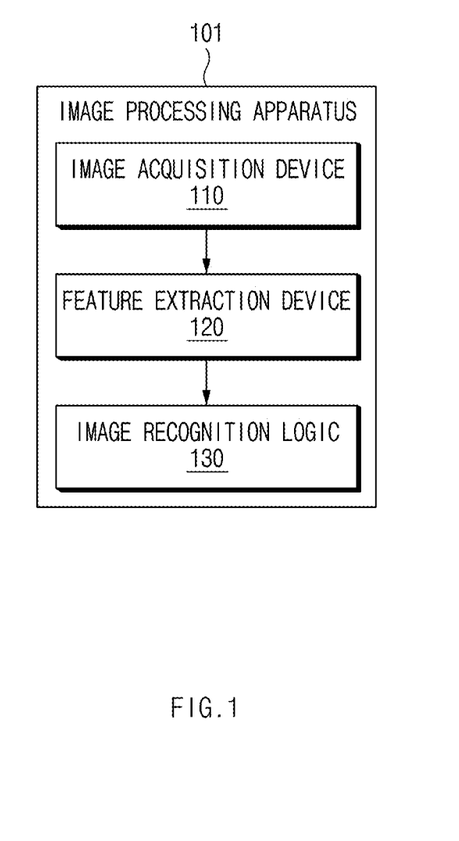
FIG. 1 is a block diagram illustrating a configuration of an image processing apparatus according to an embodiment of the present disclosure.

FIG. 1 is a block diagram illustrating a configuration of an image processing apparatus according to an embodiment of the present disclosure.

FIG. 1 is classification of a configuration of an image processing apparatus 101 according to a function of the image processing apparatus 101, but not limited thereto. Each component of FIG. 1 may be a part of a processor, a calculation device, a control device in a vehicle, or a combination thereof.

Referring to FIG. 1, the image processing apparatus 101 may include an image acquisition device 110, a feature extraction device 120, and image recognition logic 130.

The image acquisition device 110 may be configured to obtain an image necessary for image recognition or image processing. The image acquisition device 110 may be configured to obtain an image obtained by a camera module mounted on the vehicle or an image downloaded through an external server.

The feature extraction device 120 may be configured to receive an input image from the image acquisition device 110. The feature extraction device 120 may be configured to extract a feature from the received input image. The feature extraction device 120 may be configured to apply image transformation using content/style loss to images in various illumination conditions to learn an image recognition model.

The feature extraction device 120 may be configured to preprocess an image obtained in real time using the learned image recognition model. The feature extraction device 120 may be configured to deliver the feature data obtained from the image to the image recognition logic 130.

The image recognition logic 130 may be configured to receive the feature data extracted by the feature extraction device 120. The image recognition logic 130 may be configured to process the image in a specified scheme (e.g., detection or segmentation) to generate data for performing a specified function (e.g., autonomous driving).

For example, the image recognition logic 130 may be configured to recognize a person, an object, a natural object, a road, or a sign using the extracted feature data.

The image processing apparatus 101 according to an embodiment of the present disclosure may be implemented in the vehicle. In this case, the image processing apparatus 101 of the vehicle may be integrally configured with control units in the vehicle or may be implemented as a separate device to be connected with the control units of the vehicle by a separate connection means.

Figure 2:
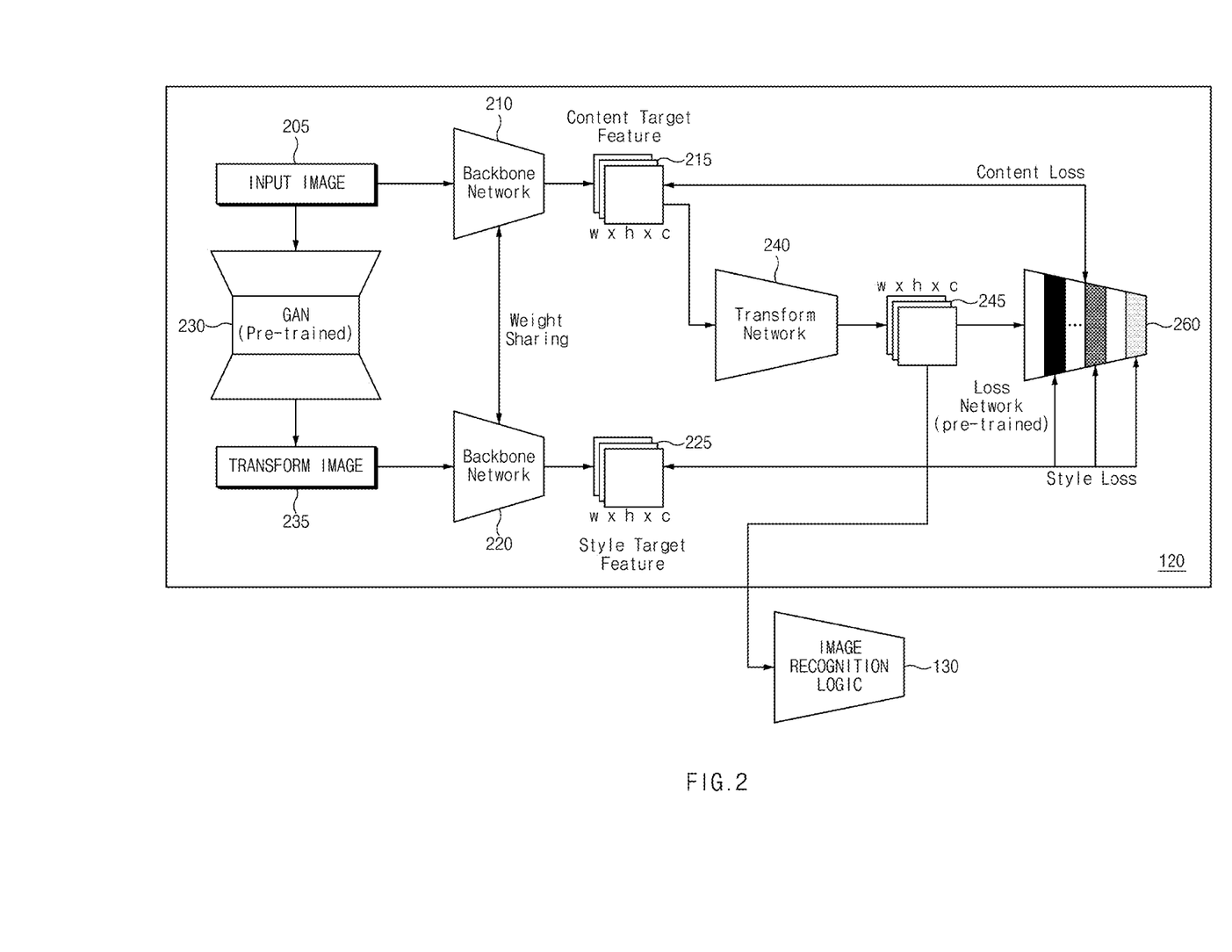
FIG. 2 is a block diagram illustrating a detailed configuration of a feature extraction device according to various embodiments.

FIG. 2 is a block diagram illustrating a detailed configuration of a feature extraction device according to various embodiments. FIG. 2 is classification according to a function of the feature extraction device, but not limited thereto.

Referring to FIG. 2, a feature extraction device 120 may receive an input image from an image acquisition device 110 of FIG. 1. The feature extraction device 120 may apply image transformation using content/style loss to images in various illumination conditions to learn an image recognition model.

The feature extraction device 120 may include a first backbone network 210, a second backbone network 220, a generative adversarial network (GAN) 230, a transform network 240, and a loss network 260.

The first backbone network 210 may have a neural network structure configured with at least a portion of convolution, batch-normalization, an activation layer, or pooling. The first backbone network 210 may receive an input image 205 and may output first feature data 215.

For example, the first backbone network 210 may be configured to receive the input image 205 having a size of $w_{image} \times h_{image} \times c_{image}$ and may output the first feature data 215 having a size of w×h×c. The first feature data 215 may have a content target feature.

The second backbone network 220 may have a neural network structure configured with at least a portion of convolution, batch-normalization, an activation layer, or pooling. The second backbone network 220 may be configured to receive a transform image 235 and may output second feature data 225. The transform image 235 may be an image into which the input image 205 may be transformed by means of the GAN 230.

For example, the second backbone network 220 may receive the transform image 205 having a size of $w_{image} \times h_{image} \times c_{image}$ and may output the second feature data 225 having a size of w×h×c. The second feature data 225 may have a style target feature.

According to an embodiment, the first backbone network 210 and the second backbone network 220 may have the same or similar configuration. The first backbone network 210 and the second backbone network 220 may share a weight associated with feature extraction with each other.

The GAN 230 may be one of image generation models, which may output the transform image 235 in the form of being similar to the input image 205 while a generative model and a discriminative model compete with each other. For example, the GAN 230 may output the converted image 235 in which the arrangement of the object or composition may be the same as that of input image 205 and the illumination or weather may be changed.

The GAN 230 may have a neural network structure configured with at least a portion of convolution, batch-normalization, an activation layer, or pooling. The GAN 230 may be pre-trained using images associated with executing a specified function (e.g., autonomous driving).

The GAN 230 may receive the input image 205 and may output the transform image 235. For example, the GAN 230 may receive the input image 205 having a size of $w_{image} \times h_{image} \times c_{image}$ and may output the transform image 235 having a size of $w_{image} \times h_{image} \times c_{image}$.

It is illustratively shown in FIG. 2 that the GAN 230 may be used as the image generation model, but not limited thereto. Various image generation models or various image transform models may be used.

The transform network 240 (e.g., an illumination-robust feature transform network (IRFT)) may have a neural network structure configured with at least a portion of convolution, batch-normalization, an activation layer, or pooling.

The transform network 240 may receive the first feature data 215 and may output third feature data 245. For example, the transform network 240 may receive the first feature data 215 having a size of w×h×c and may output the third feature data 245 having a size of w×h×c.

The transform network 240 may be learned such that the third feature data 245 has a form similar to content of the first feature data 215 which may be content target feature data by means of the loss network 260.

Furthermore, the transform network 240 may be learned such that the third feature data 245 has a form similar to a style of the second feature data 225 which may be style target feature data by means of the loss network 260.

Even when the input image 205 (e.g., a dawn/night image) in an illumination environment which may not be used for learning may be used, the third feature data 245 may have information of feature data obtained from an image (e.g., a day image) in an illumination environment which may be used for learning.

The third feature data 245 may be similar to a feature extracted from an image processed in previously learned image recognition logic (e.g., an image captured during the day).

The loss network 260 may have a neural network structure configured with at least a portion of convolution, batch-normalization, an activation layer, or pooling. The loss network 260 may receive the third feature data 245.

The loss network 260 may learn the transform network 240 such that the third feature data 245 has a form similar to content of the first feature data 225 and has a form similar to a style of the second feature data 225.

Figure 3A:
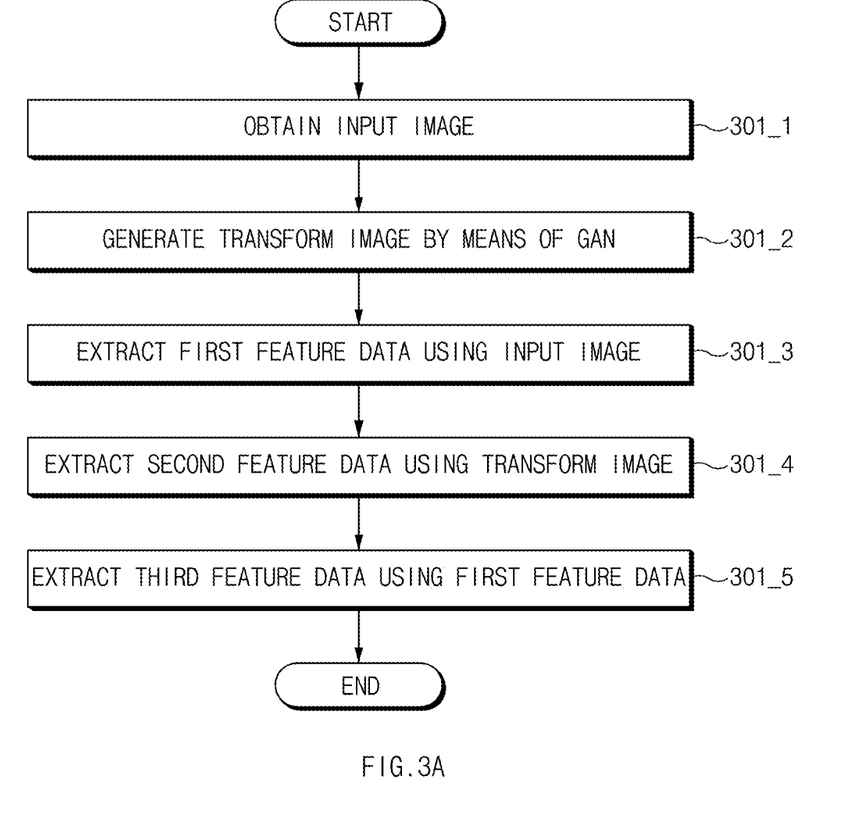
FIG. 3A is a flowchart illustrating learning of an image recognition model according to various embodiments.

FIG. 3A is a flowchart illustrating learning of an image recognition model according to various embodiments.

Figure 3B:
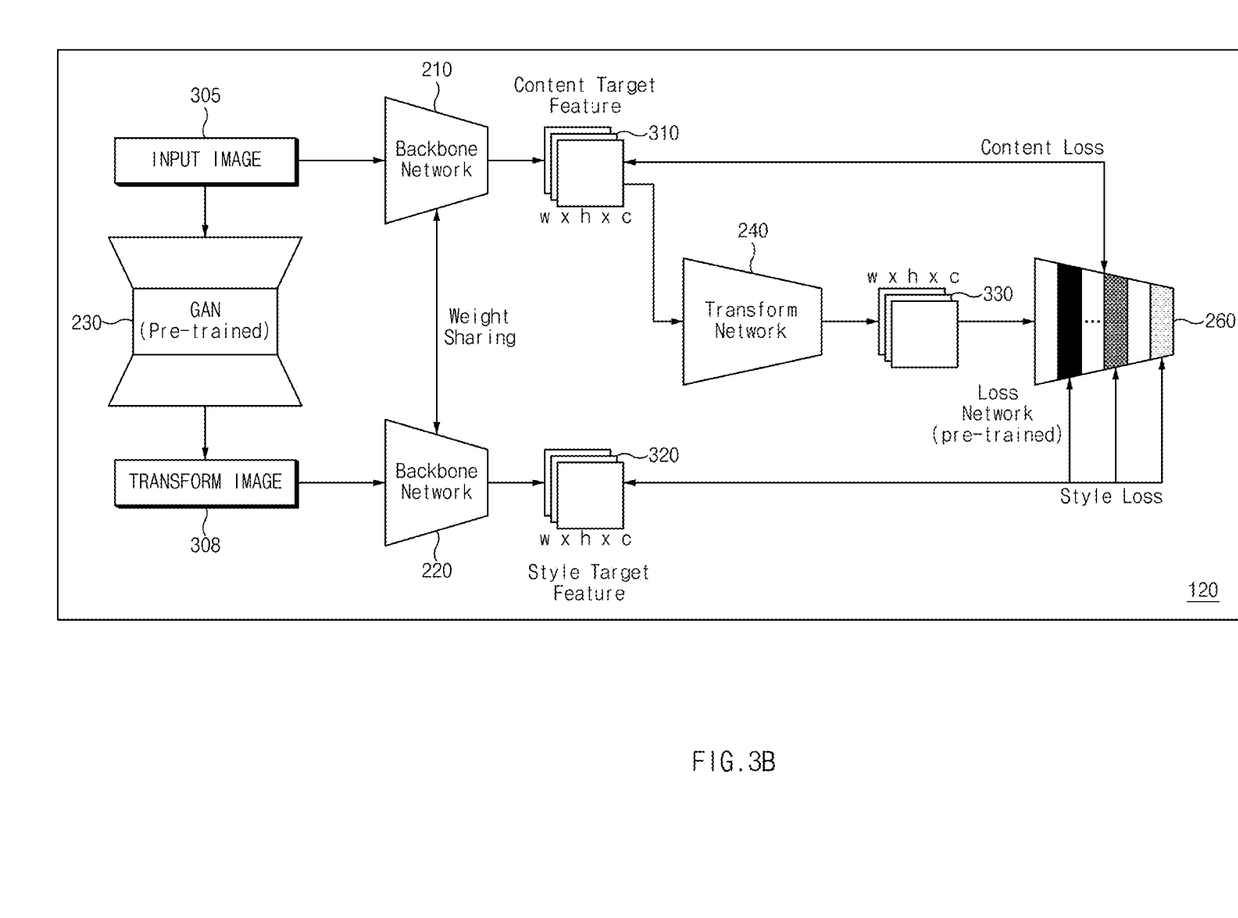
FIG. 3B is a learning flow diagram of a feature extraction device according to various embodiments.

Referring to FIG. 3A, in operation 301_1, a feature extraction device 120 of FIG. 3B may obtain an input image. The input image may be an image obtained by a camera module mounted on a vehicle or an image downloaded through an external server.

In operation 301-2, the feature extraction device 120 may generate a transform image, illumination of which may be changed from an input image 305 of FIG. 3B, by means of a GAN 230 of FIG. 3B. For example, the GAN 230 may generate a transform image, which may be similar to an image obtained at dawn or at night, using an input image captured during the day.

In operation 301_3, the feature extraction device 120 may extract first feature data from the input image by means of a first backbone network 210 of FIG. 3B. The first feature data 215 may have a content target feature.

In operation 301_4, the feature extraction device 120 may extract second feature data from a transform image by means of a second backbone network 220 of FIG. 3B. The second feature data may have a style target feature.

In operation 301_5, the feature extraction device 120 may generate third feature data from the first feature data by means of a transform network 240 of FIG. 3B. The third feature data may be generated with reference to content information from the first feature data and style information from the second feature data.

FIG. 3B is a learning flow diagram of a feature extraction device according to various embodiments.

Referring to FIG. 3B, a feature extraction device 120 may be pre-trained using various input images 305. For example, the input images 305 may be images obtained in various illumination environments (e.g., day/dawn/night).

The input image 305 may be input to a first backbone network 210. The first backbone network 210 may extract first feature data 310 from the input image 305. The first feature data 310 may have a content target feature.

The input image 305 may be input to a GAN 230. The input image 305 may be transformed into a transform image 308 by means of the GAN 230. For example, the GAN 230 may generate the transform image 308, which may be similar to an image obtained at dawn or at night, using the input image 305 captured during the day.

The transform image 308 may be input to a second backbone network 220. The second backbone network 220 may be the same in weight associated with feature extraction as the first backbone network 210.

The second backbone network 220 may extract second feature data 320 using the transform image 308. The second feature data 320 may have a style target feature.

Because content of the transform image 308 passes through the GAN 230, a distortion may occur. However, a style of the transform image 308 may be similar to an image processed in previously learned image recognition logic (e.g., an image captured during the day).

The transform network 240 (e.g., an illumination-robust feature transform network (IRFT)) may receive the first feature data 310 and may output third feature data 330. The transform network 240 (e.g., the IRFT) may generate the third feature data 330 with reference to content/style information, which may be received by the loss network 260.

The third feature data 330 may be generated with reference to content information from the first feature data 310 and style information from the second feature data 320.

The third feature data 330 may have a content target feature for the input image 305. Content information included in the third feature data 330 may be the same as information obtained from the input image 305 (the content target feature).

The third feature data 330 may have a style target feature for the transform image 308. Style information included in the third feature data 330 may be the same as information obtained from the second feature data 320 generated by means of the transform image 308 (the style target feature).

Figure 4:
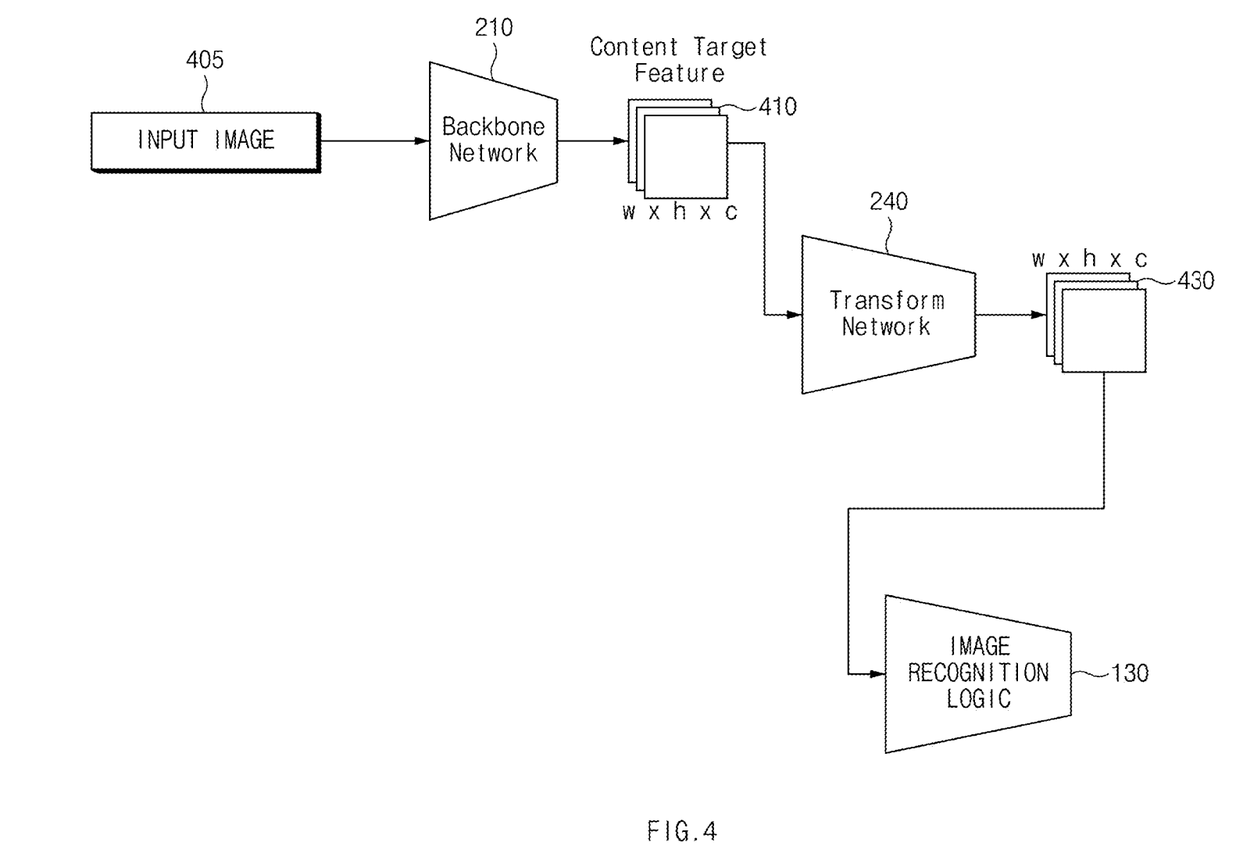
FIG. 4 is a flow diagram illustrating inference for image recognition according to various embodiments.

FIG. 4 is a flow diagram illustrating inference for image recognition according to various embodiments.

Referring to FIG. 4, an input image 405 may be input to a first backbone network 210. For example, the input image 405 may be an image having a feature which may not be used for learning by image recognition logic 130 (e.g., an image obtained at dawn or at night).

The first backbone network 210 may extract first feature data 410 using the input image 405. The first feature data 410 may have a content target feature for the input image 405.

The first feature data 410 may be input to a transform network 240. The transform network 240 may generate third feature data 430 using the first feature data 410. The third feature data 430 may have a feature of an image which may be used for learning by the image recognition logic 130.

The transform network 240 may transmit the third feature data 430 to the image recognition logic 130. The image recognition logic 130 may process the image in a specified scheme (e.g., detection or segmentation) to generate data for performing a specified function (e.g., autonomous driving).

Figure 5:
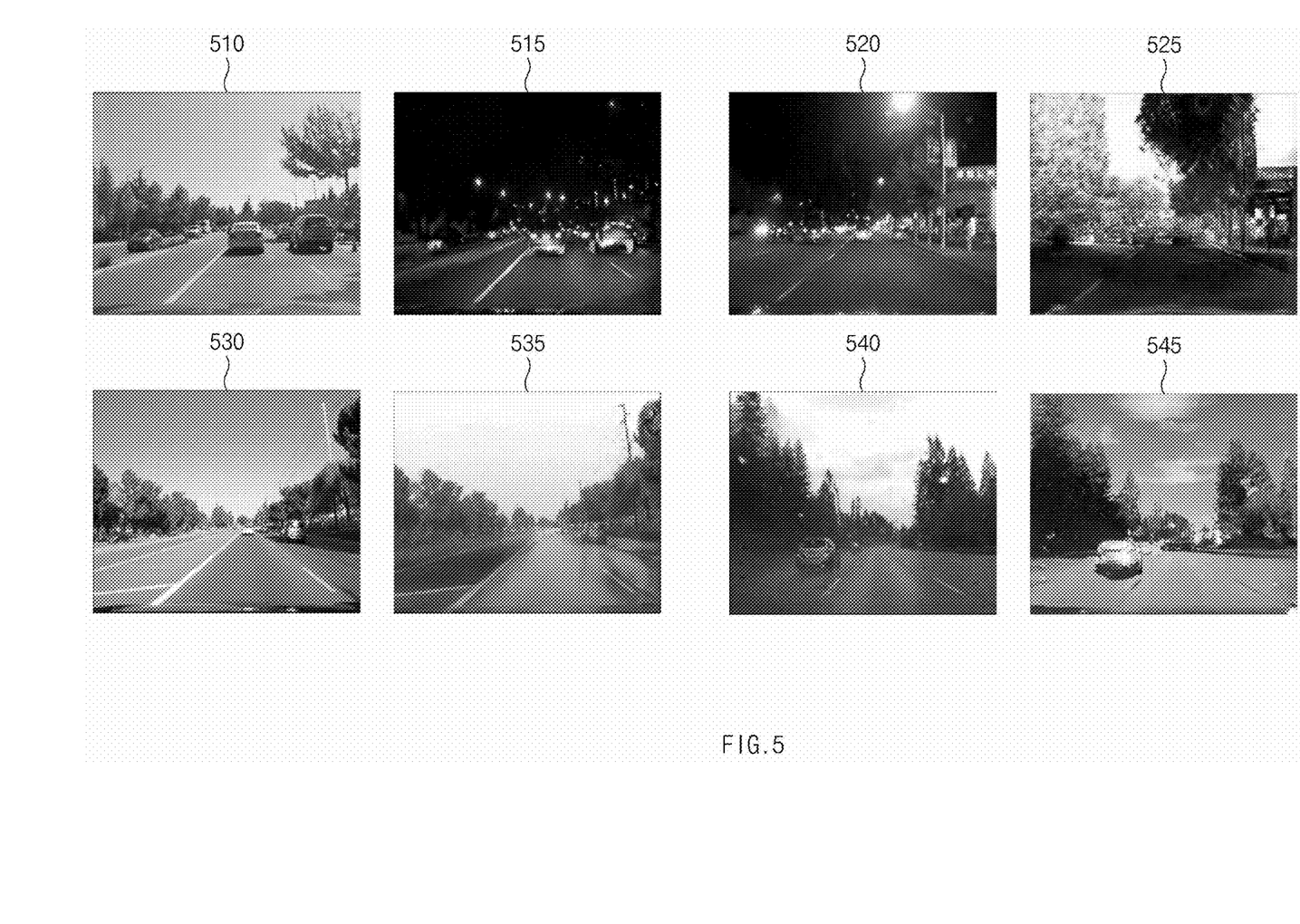
FIG. 5 is a drawing illustrating a transform image generated using a GAN according to various embodiments.

FIG. 5 is a drawing illustrating a transform image generated using a GAN according to various embodiments.

Referring to FIG. 5, a GAN 230 of FIG. 2 or 3B may output transform images 515, 525, 535, and 545, illumination or weather of which may be changed from input images 510, 520, 530, and 540. The GAN 230 may be pre-trained using images associated with autonomous driving.

The first input image 510 may be an image captured while the sun shines during the day. The first input image 510 may be input to the GAN 230. The first input image 510 may be transformed into the first transform image 515 by means of the GAN 230. The first transform image 515 may have a feature which may be the same as or similar to an image captured at night.

The second input image 520 may be an image captured while the street lights may be on at night. The second input image 520 may be input to the GAN 230. The second input image 520 may be transformed into the second transform image 525 by means of the GAN 230. The second transform image 525 may have a feature which may be the same as or similar to an image shaded by trees during the day.

The third input image 530 may be an image captured while the sun shines during the day. The third input image 530 may be input to the GAN 230. The third input image 530 may be transformed into the third transform image 535 by means of the GAN 230. The third transform image 535 may have a feature which may be the same as or similar to an image captured during the day when it may be cloudy or rainy.

The fourth input image 540 may be an image captured during the day when it may be cloudy or rainy. The fourth input image 540 may be input to the GAN 230. The fourth input image 540 may be transformed into the fourth transform image 545 by means of the GAN 230. The fourth transform image 545 may have a feature which may be the same as or similar to an image captured while the sun shines during the day.

Figure 6:
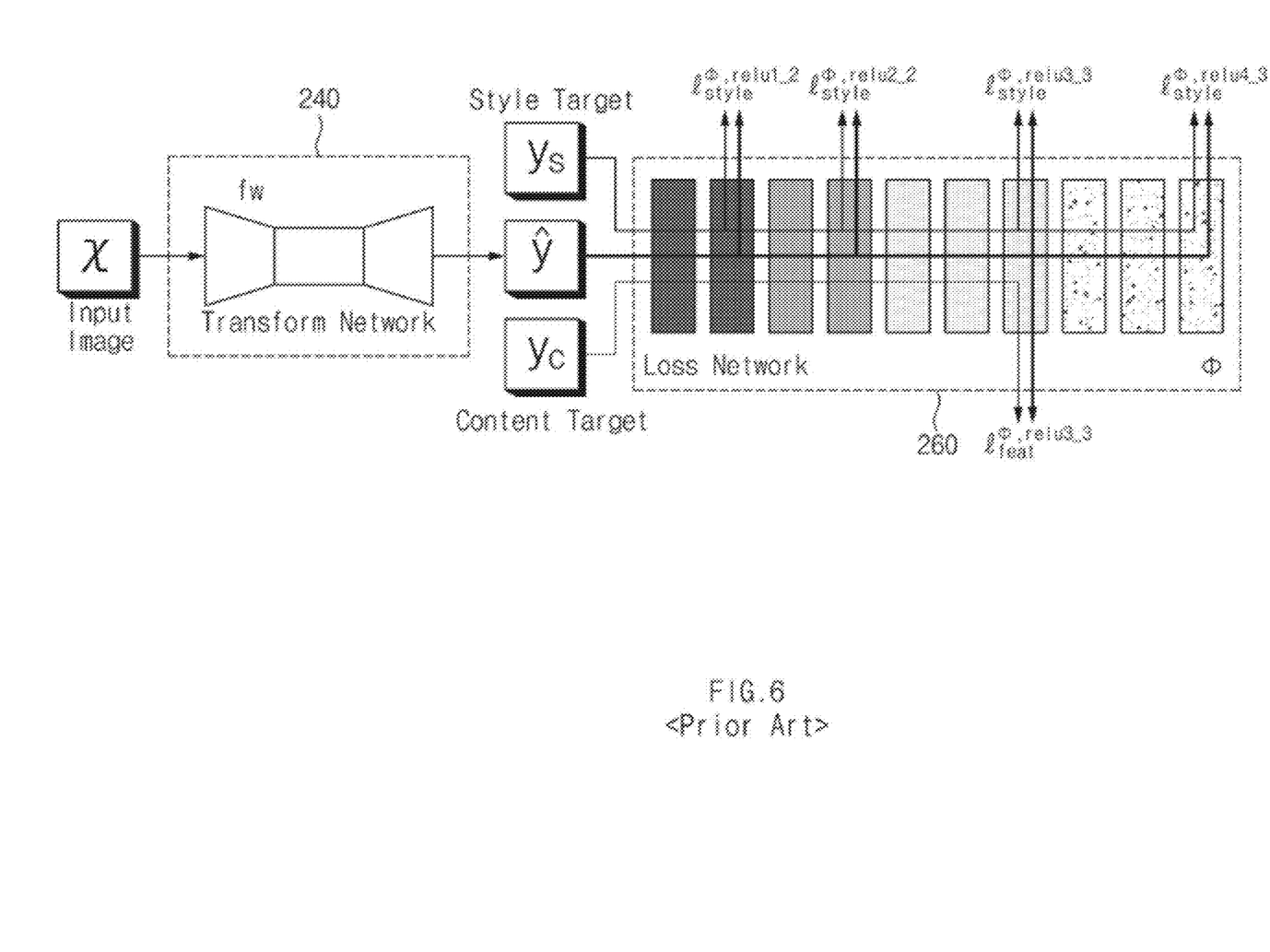
FIG. 6 illustrates learning of a transform network through a loss network according to various embodiments.

FIG. 6 illustrates learning of a transform network through a loss network according to various embodiments.

Referring to FIG. 6, when passing feature data $y_s$, $ŷ$, and $y_c$ through a loss network 260 in which a weight may be fixed, feature data may be generated from each input in each layer relu1_2, relu2_2, relu3_3, or relu4_3 of the loss network 260.

The loss network 260 may receive feature data 9 generated from an input image x (e.g., third feature data 245 of FIG. 2 or third feature data 330 of FIG. 3B) from a transform network 240 of FIG. 2 or 3B.

The loss network 260 may compare features generated in the specified layer relu3_3 using feature data 9 with features generated in the specified layer relu3_3 using content target feature data K. (e.g., first feature data 215 of FIG. 2 or first feature data 310 of FIG. 3B).

The loss network 260 may calculate a difference by the comparison and may learn the transform network 240 by means of backpropagation. As a result, the feature data 9 may be learned to have a form similar to content of the content target feature dat0 $y_c$.

The loss network 260 may compare features generated in each layer relu1_2, relu2_2, relu3_3, or relu4_3 using the feature data $ŷ$ with features generated in each layer relu1_2, relu2_2, relu3_3, or relu4_3 using style target feature data $y_s$ (e.g., second feature data 225 of FIG. 2 or second feature data 320 of FIG. 3B).

The loss network 260 may calculate a difference by the comparison and may learn the transform network 240 by means of backpropagation. As a result, the feature data 9 may be learned to have a form similar to a style of the style target feature data $y_s$.

Figure 7:
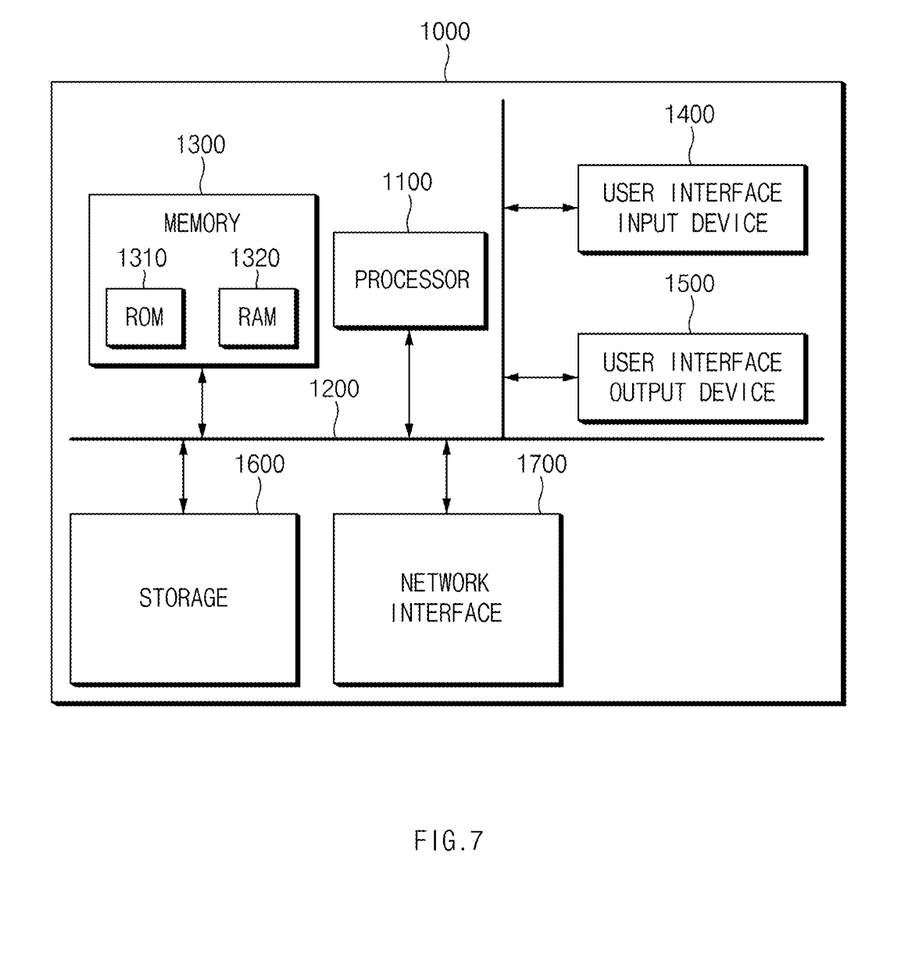
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which may be connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which may be executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may provide the image processing apparatus capable of robustly operating even in various illumination environments.

The present technology may preprocess image data in real time using a previously learned image recognition model, without using a high-performance generative adversarial network (GAN).

The present technology may apply image transformation using content/style loss to images in various illumination conditions to learn an image recognition model and may perform inference associated with autonomous driving using the learned image recognition model. As a result, the present technology may reduce additional costs for obtaining various pieces of data according to various illumination environments.

In addition, various effects ascertained directly or indirectly through the present disclosure may be provided.

Hereinabove, although the present disclosure has been described with reference to exemplary embodiments and the accompanying drawings, the present disclosure may not be limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An image processing apparatus, comprising:
    an image acquisition device configured to obtain an input image through a device in a vehicle or an external server;
    a feature extraction device configured to extract feature data from the input image; and
    image recognition logic configured to recognize an object from the feature data,
    wherein the feature extraction device is configured to generate a transform image from the input image using a generative adversarial network (GAN), extract first feature data associated with content from the input image, extract second feature data associated with a style from the transform image, and learn an image recognition model based on the first feature data and the second feature data;
    wherein the feature extraction device includes a first backbone network and a second backbone network,
    wherein the first backbone network is configured to extract the first feature data using the input image, and
    wherein the second backbone network is configured to extract the second feature data using the transform image.

2. The image processing apparatus of claim 1, wherein the input image is a first image with first illumination, and
    wherein the transform image is a second image with second illumination brighter than the first illumination.

3. The image processing apparatus of claim 1, wherein the input image is a third image associated with autonomous driving of the vehicle.

4. A vehicle comprising the image processing apparatus of claim 1.

5. The image processing apparatus of claim 1, wherein the first backbone network and the second backbone network have a same weight in conjunction with extracting the first feature data or the second feature data.

6. The image processing apparatus of claim 5, wherein the feature extraction device includes a transform network and a loss network,
    wherein the transform network is configured to generate third feature data using the first feature data, and
    wherein the third feature data has a content feature of the first feature data and a style feature of the second feature data.

7. The image processing apparatus of claim 6, wherein the loss network is configured to learn the transform network based on the content feature of the first feature data and the style feature of the second feature data.

8. The image processing apparatus of claim 7, wherein the loss network is configured to compare features extracted from the first feature data with a feature extracted from the third feature data and learn the transform network in conjunction with content of the input image.

9. The image processing apparatus of claim 7, wherein the loss network is configured to compare features extracted from the second feature data with a feature extracted from the third feature data and learn the transform network in conjunction with a style of the input image.

10. The image processing apparatus of claim 6, wherein the feature extraction device is configured to transmit the third feature data to the image recognition logic.

11. An image processing method of an image processing apparatus comprising:
    obtaining an input image through a device in a vehicle or an external server;
    generating a transform image from the input image using a generative adversarial network (GAN);
    extracting first feature data associated with content from the input image;
    extracting second feature data associated with a style from the transform image; and
    learning an image recognition model based on the first feature data and the second feature data;
    wherein the extracting of the first feature data includes extracting, by a first backbone network, the first feature data using the input image, and
    wherein the extracting of the second feature data includes extracting, by a second backbone network, the second feature data using the transform image.

12. The image processing method of claim 11, wherein the input image is an image with first illumination, and
    wherein the transform image is an image with second illumination brighter than the first illumination.

13. The image processing method of claim 11, wherein the first backbone network and the second backbone network have the same weight in conjunction with extracting the first feature data or the second feature data.

14. The image processing method of claim 11, further comprising:
    generating third feature data using the first feature data,
    wherein the third feature data has a content feature of the first feature data and a style feature of the second feature data.

15. The image processing method of claim 14, wherein the learning of the image recognition model includes:
    learning the transform network based on the content feature of the first feature data and the style feature of the second feature data.

16. The image processing method of claim 15, wherein the learning of the image recognition model further includes:
    comparing features extracted from the first feature data with a feature extracted from the third feature data and learns the image recognition model in conjunction with content of the input image.

17. The image processing method of claim 15, wherein the learning of the image recognition model further includes:
    comparing features extracted from the second feature data with a feature extracted from the third feature data and learns the image recognition model in conjunction with a style of the input image.

18. The image processing method of claim 14, further comprising:

recognizing an object using the third feature data.

* * * * *